United States Patent [19]

Santos

[11] Patent Number: 4,837,635
[45] Date of Patent: Jun. 6, 1989

[54] A SCANNING SYSTEM IN WHICH A PORTION OF A PREVIEW SCAN IMAGE OF A PICTURE DISPLACED ON A SCREEN IS SELECTED AND A CORRESPONDING PORTION OF THE PICTURE IS SCANNED IN A FINAL SCAN

[75] Inventor: Francisco E. Santos, Fremont, Calif.

[73] Assignee: Hewlett-Packard Company, Palto Alto, Calif.

[21] Appl. No.: 146,897

[22] Filed: Jan. 22, 1988

[51] Int. Cl.$^4$ ............ H04N 1/393; H04N 1/00; H04N 1/04

[52] U.S. Cl. .................. 358/287; 358/256; 358/285

[58] Field of Search ............ 358/256, 287, 285

[56] References Cited

U.S. PATENT DOCUMENTS

| | | | |
|---|---|---|---|
| 4,635,108 | 1/1987 | Reeber et al. | 358/287 |
| 4,656,524 | 4/1987 | Norris et al. | 359/284 |
| 4,656,525 | 4/1987 | Norris | 358/284 |
| 4,673,989 | 6/1987 | Yamada et al. | 358/287 |
| 4,716,470 | 12/1987 | Levine | 358/256 |
| 4,733,304 | 3/1988 | Homma et al. | 358/287 |
| 4,751,583 | 6/1988 | Levine | 358/256 |
| 4,771,336 | 9/1988 | Ohtorii | 358/285 |

Primary Examiner—James J. Groody
Assistant Examiner—Randall S. Svihla
Attorney, Agent, or Firm—Alan H. Haggard

[57] ABSTRACT

An improved scanner is presented which enables a user to preview scan a picture and set out on a screen exactly what portion of the picture he desires to scan. The scanner allows a preview scan of the picture to be made. The preview scan presents a preview image. The user is able to specify what portion of the picture he wants by enclosing that portion of the preview image in a box. Then the scanner performs a final scan which scans only the specified portion of the picture. When performing the final scan, the user may select a percentage amount to reduce or enlarge the image when printed as a printed copy. As the user changes the percentage amount, the dimensions of the resulting printed copy are displayed. The dimensions are calculated by determining the dimensions of the portion to be scanned, and reducing or enlarging the dimensions proportionate to the amount the printed copy is reduced or enlarged.

8 Claims, 11 Drawing Sheets

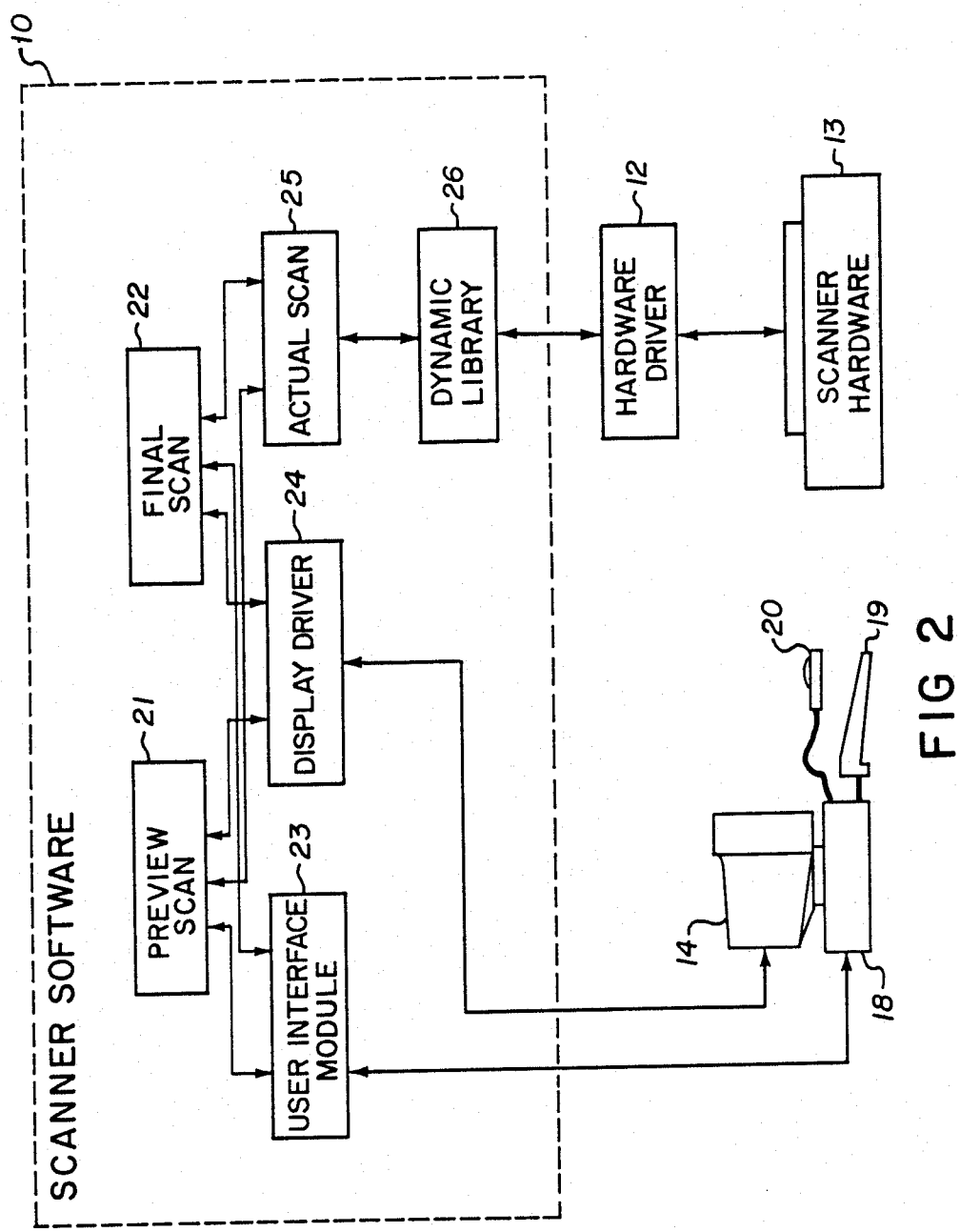

A SCANNING SYSTEM IN WHICH A PORTION OF A PREVIEW SCAN IMAGE OF A PICTURE DISPLACED ON A SCREEN IS SELECTED AND A CORRESPONDING PORTION OF THE PICTURE IS SCANNED IN A FINAL SCAN

BACKGROUND

The present invention relates to the use of a preview scan in order to allow a user to more accurately select exactly what portion of a picture he finally scans.

In the prior art for scanners, a picture is placed on a scanner window. The scanner scans the picture and stores the resultant image in memory in a computer. The image may then be displayed upon a monitor.

Some scanners allow a user to select a portion of the drawing to be scanned. This is done by actually specifying the dimensions of the image to be scanned. A viewer therefore needs to use a ruler or some other measuring device to determine exactly what image he will receive. This use of manual measurement is cumbersome, and often the performance of many scans are required in order for a user to obtain exactly the image he desires to scan.

Further some scanner hardware may allow an image to be reduced or enlarged when the image is finally printed upon a printer. However, the user is typically only told by what percentage the image will be reduced or enlarged. This often leads to experimentation by a user to discover just how much an image needs to be reduced or enlarged in order to be at an optimum size for a particular use.

SUMMARY OF THE INVENTION

In accordance with the preferred embodiment of the present invention, an improved scanner is presented which enables a user to preview scan a picture and set out on a screen exactly what portion of the picture he desires to scan. The scanner allows a preview scan of the picture to be made. The preview scan presents a preview image. The user is able to specify what portion of the picture he wants, by enclosing that portion of the preview image in a box. Then the scanner performs a final scan which scans only the specified portion of the picture.

When performing the final scan, the user may select a percentage amount to reduce or enlarge the image when printed as a printed copy. As the user changes the percentage amount, the dimensions of the resulting printed copy are displayed. The dimensions are calculated by determining the dimensions of the portion to be scanned, and reducing and enlarging the dimensions proportionate to the amount the printed copy is reduced and enlarged.

BRIEF DESCRIPTION OF THE DRAWINGS

FIG. 2 is a more detailed block diagram of scanner software in accordance with the preferred embodiment of the present invention.

DESCRIPTION OF THE PREFERRED EMBODIMENT

Figure 1:
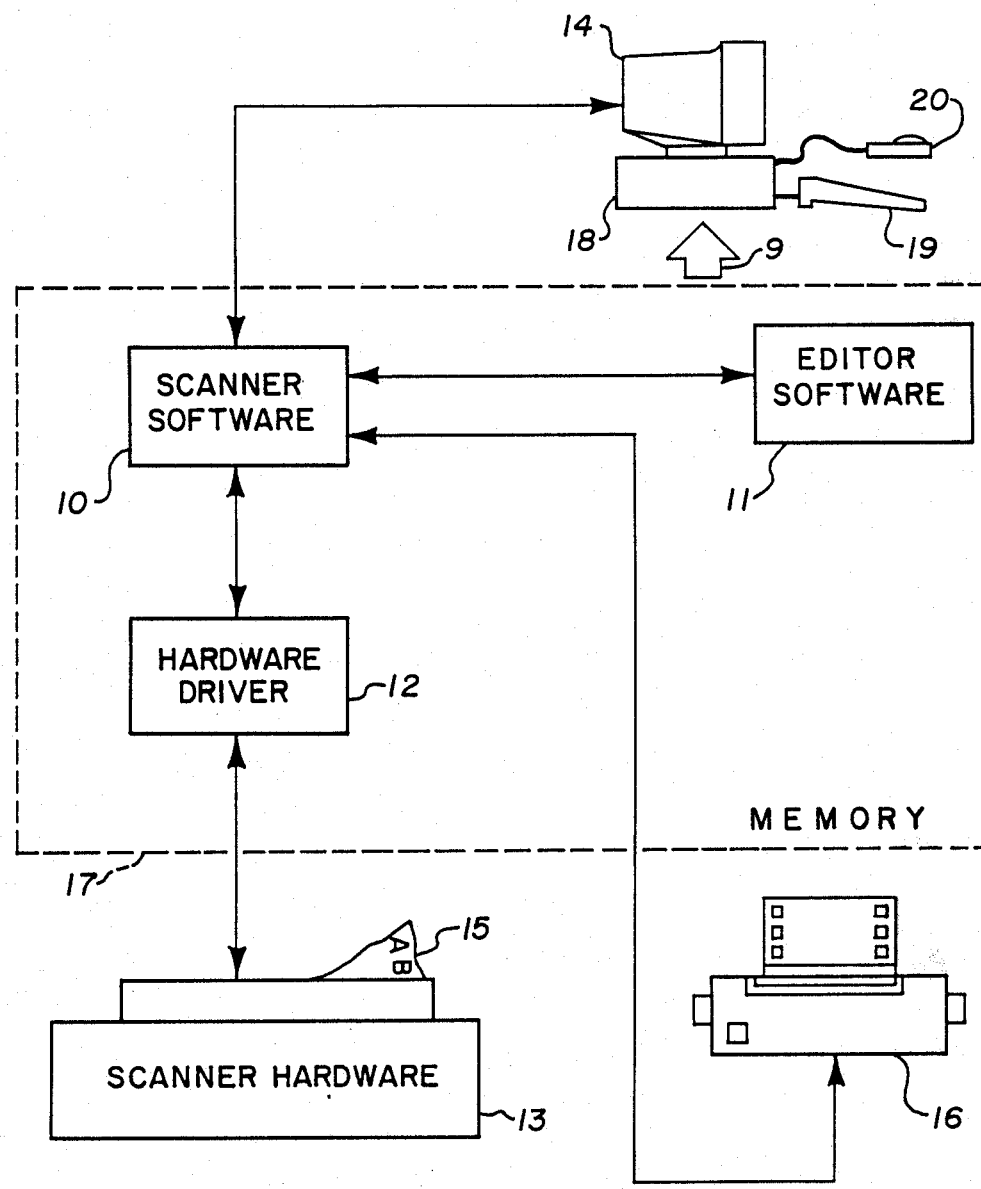
FIG. 1 is a block diagram of a scanner system in accordance with the preferred embodiment of the present invention.

FIG. 1 shows a block diagram of a scanner system, used in the present invention. A computer 18 is shown coupled to monitor 14. Also coupled to computer 18 is a keyboard 19 and a mouse 20.

Figure 3:
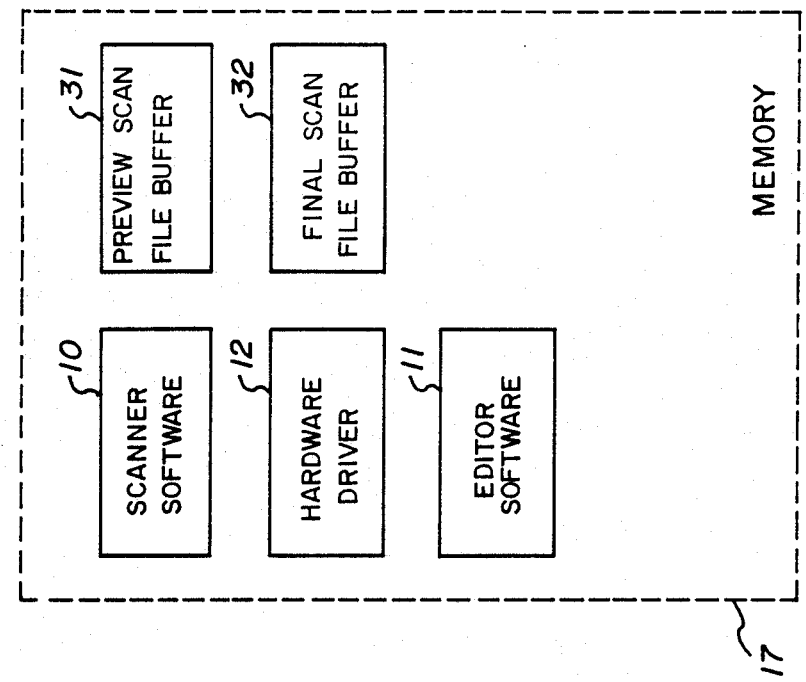
FIG. 3 shows programs in a computer memory in accordance with the preferred embodiment of the present invention.

Scanner software 10 interacts with a hardware driver 12 to cause scanner hardware 13 to scan a picture 15 placed upon scanner hardware 13. Upon successful retrieval of an image of picture 15, the image is displayed upon a monitor 14 for view by a user. A user may then modify the image using editor software 11 and/or print out the image using a printer 16. Scanner software 10, hardware driver 12 and editor software 11 all reside within a system memory 17, as shown by FIG. 3. As demonstrated by arrow 9, memory 17 resided in computer 18.

FIG. 2 shows a more detailed block diagram of scanner software 10. Scanner software 10 is shown to contain a preview scan module 21, a final scan module 22, a user interface module 23, a display driver module 24, an actual scan module 25 and a dynamic library module 26.

The system operates as follows. When a user desires to capture an image of a picture 15, he places the picture upon scanner hardware 13. He then, through user interface module 23, invokes preview scan module 21. Preview scan module 21 crates a data structure containing scan parameters which specify: (1) intensity of the displayed image; (2) resolution of the image, (3) whether the image is to be displayed in gray scale or as line art; (4) whether to display the negative of the image; (5) scaling factors. In the preferred embodiment the only parameters for a preview scan which are determined by the user are the intensity of the displayed image and whether the image is to be displayed in gray scale or as line art. The other parameters are defaults chosen by preview scan module 21. Preview scan module 21 also creates a file buffer 31 in memory 17 which is the destination where the scanned image will be stored, as shown in FIG. 3.

Preview scan module 21 sends formatted commands through actual scan module 25, through dynamic library 26, through hardware driver 12 to scanner hardware 13. These formatted commands include the scan parameters. Scanner hardware 13, by evaluating the contrast (i.e., determining where contrast within the scanned image ceases, thus indicating the boundaries of picture 15), determines the size of picture 15, and notifies preview scan 21 the number of pixels in the x direction and the number of pixels in the y direction.

Preview scan module 21, through actual scan module 25, through dynamic library 26 through hardware driver 12 directs scanner hardware 13 to scan picture 15. Picture 15 is scanned and placed in file buffer 31.

Once the image is placed in file buffer 31, preview scan module 21 invokes user interface module 23, which displays the captured image of picture 15 onto monitor 14. As shown below, user may then select exactly which portion of picture 15 will be captured in a final scan. Additionally, user interface module 23 allows a user to determine the dimensions of a printed copy of the image. As described below, as user selects the amount of reduction or enlargement of a scanned image, user interface module 23 calculates the dimensions of the resulting printed copy and causes these to be displayed on monitor 14.

Once a user has selected which portion of picture 15 he wants to capture, a final scan is performed as follows. Final scan module 22, through user interface module 23, asks a user for information as to scan parameters. These scan parameters specify: (1) intensity of the displayed image; (2) resolution of the image, (3) whether the image is to be displayed in gray scale or as line art; (4) whether to display the negative of the image; (5) scaling factors; (6) what will be the image size when printed. Final scan module 22 also creates a file buffer 32 in memory 17 which is the destination where the scanned image will be stored, as shown in FIG. 3.

Final scan module 22 sends formatted commands through actual scan module 25, through dynamic library 26, through hardware driver 12 to scanner hardware 13. These formatted commands include the scan parameters. Final scan module 22 then directs scanner hardware 13 to scan picture 15. Picture 15 is scanned and the resultant obtained image of picture 15 is placed in file buffer 32.

Once the image of picture 15 is placed in file buffer 32, final scan module 22 sends an address of file buffer 32 to editor software 11 Editor software 11, using the address to access the contents of file buffer 32, displays the captured image of picture 15 on monitor 14.

Figure 2A:
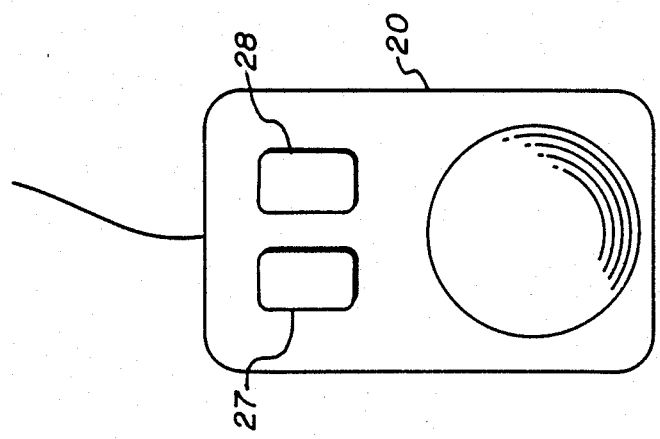
FIG. 2A shows a mouse used in the preferred embodiment of the present invention.

FIG. 2A shows mouse 20 including a button 27 and a button 28.

FIGS. 4-11 demonstrate how a user would perform a preview scan and a final scan according to the preferred embodiment of the present invention.

Figure 4:
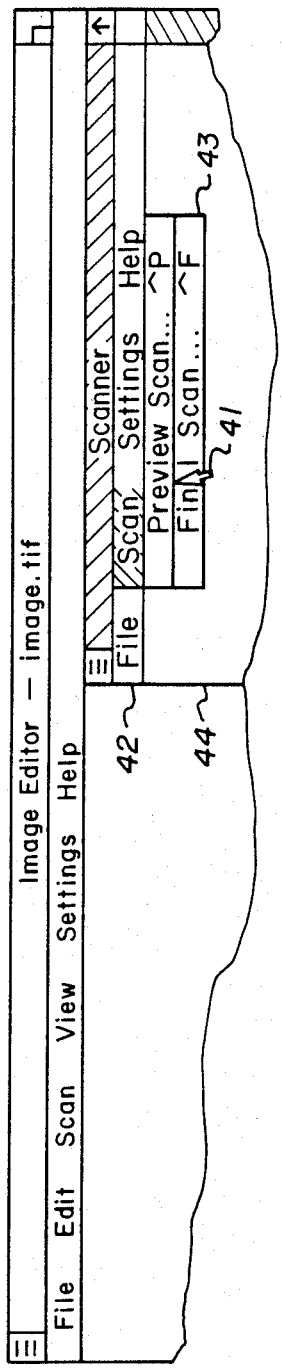
FIGS. 4–12 shows how a user utilizes the preferred embodiment of the present invention.

In FIG. 4, a scan window 44 appears on the screen of monitor 14. Movement of a cursor 41 corresponds to movement of mouse 20 on a flat surface. A menu bar 42 appears at the top of window 44. A user brings up a pull down menu 43, by stationing cursor 41 over "Scan" in menu bar 42. Then user depresses button 27 on mouse 20. In order to perform a preview scan of a picture 15 on scanner hardware 13, the user must station cursor 41 over "Preview Scan" in pull down menu 43, and then release button 27.

Figure 5:
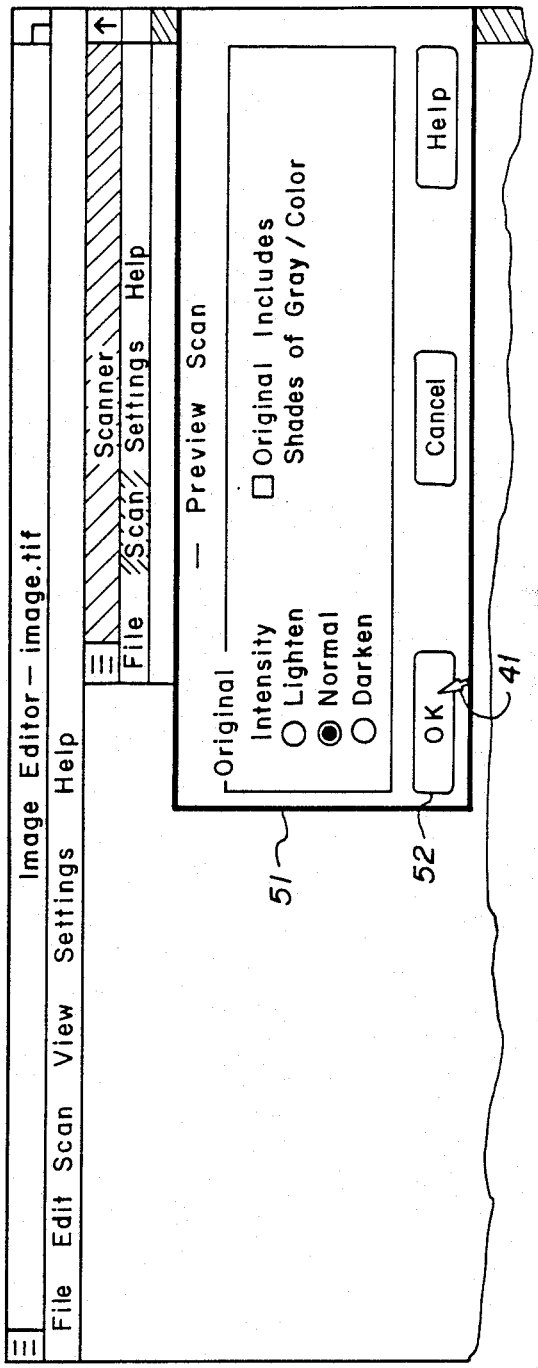

Upon release of button 27, dialog box 51 appears on monitor 14, as shown in FIG. 5. Using mouse 20, the user may adjust the intensity of the scan of the original, and may indicate that the original includes shades of gray or shades of color.

Once the user is satisfied with his selections, he places cursor 41 over region 52. Upon pressing and releasing button 27, a preview scan is performed and image 61 appears on monitor 14, as shown in FIG. 6.

Figure 6:
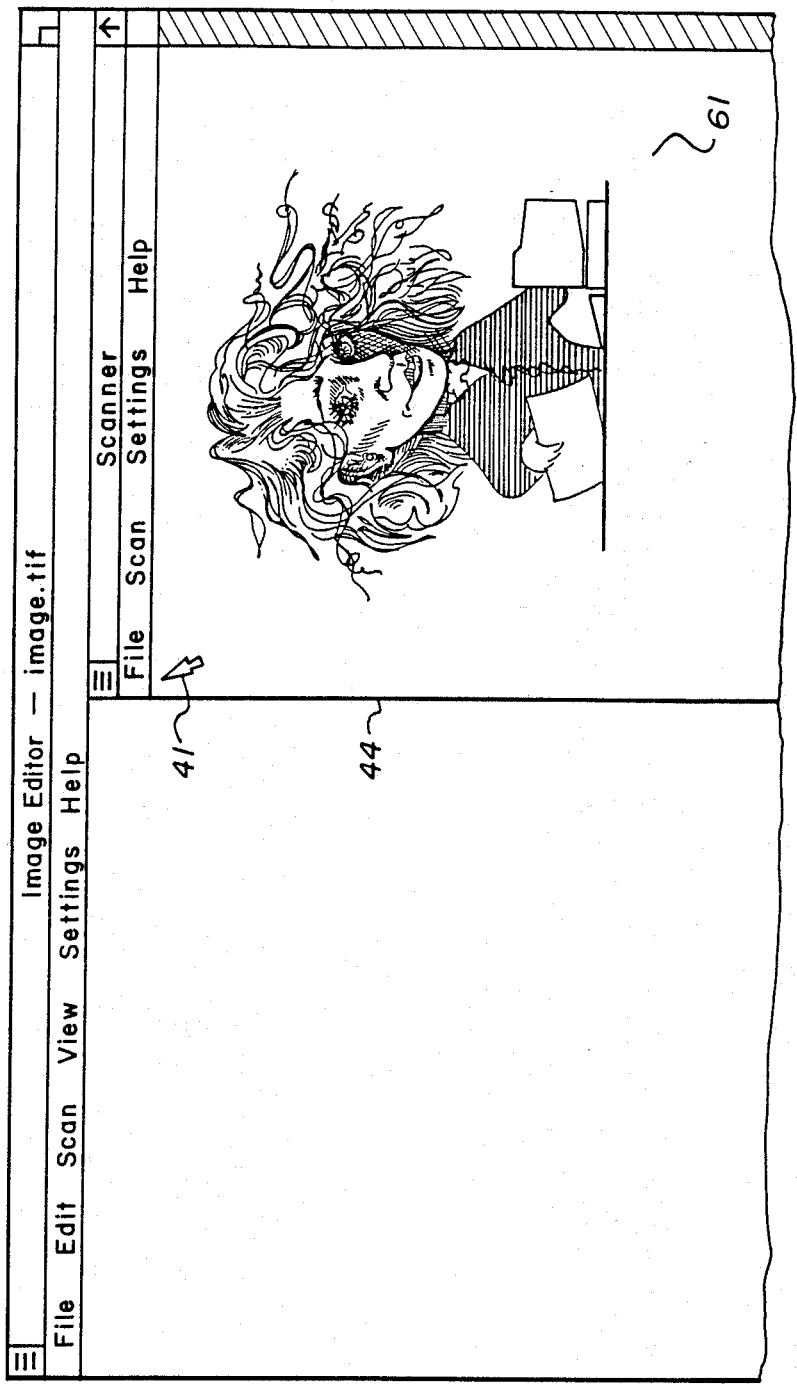
Figure 7:
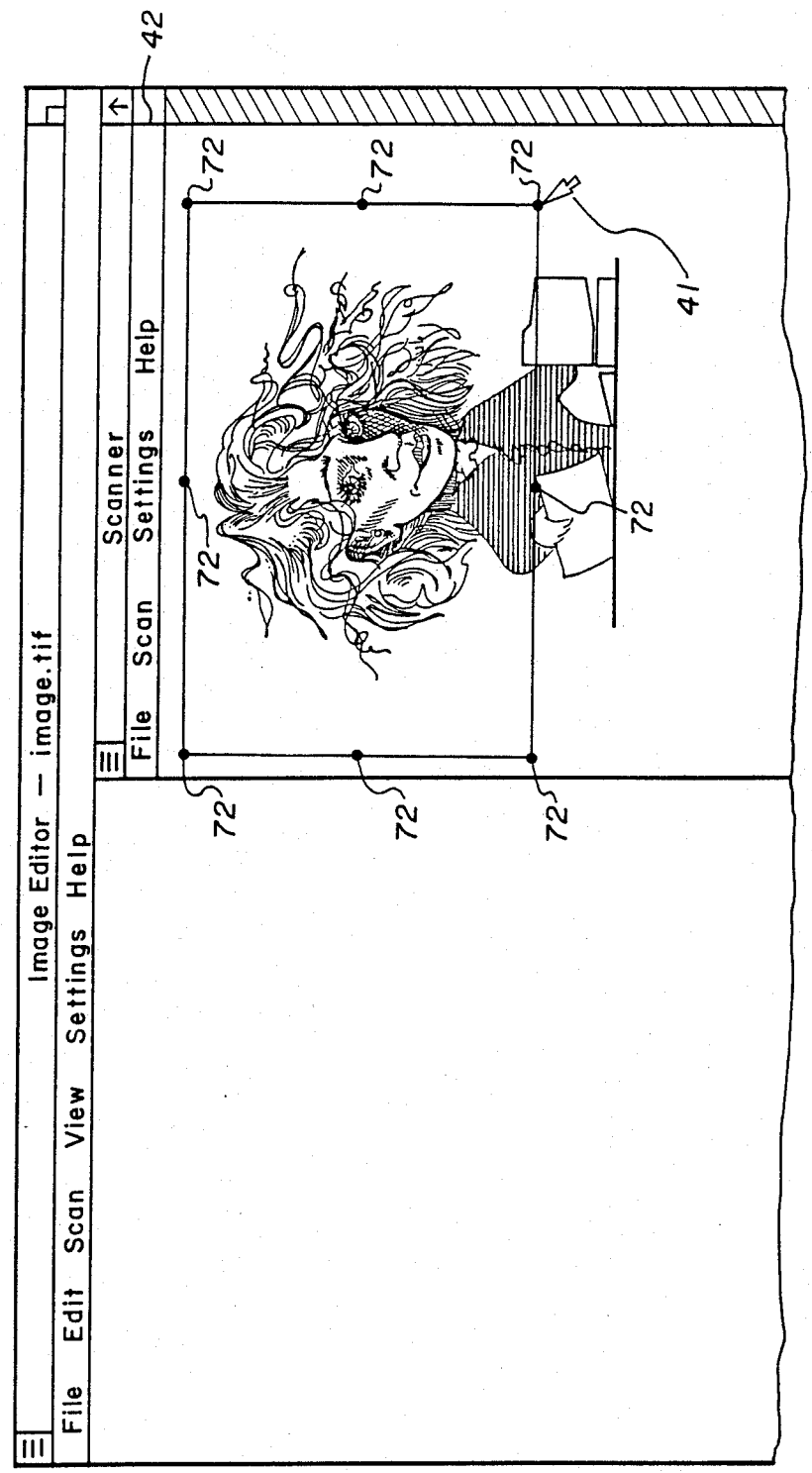
Figure 8:
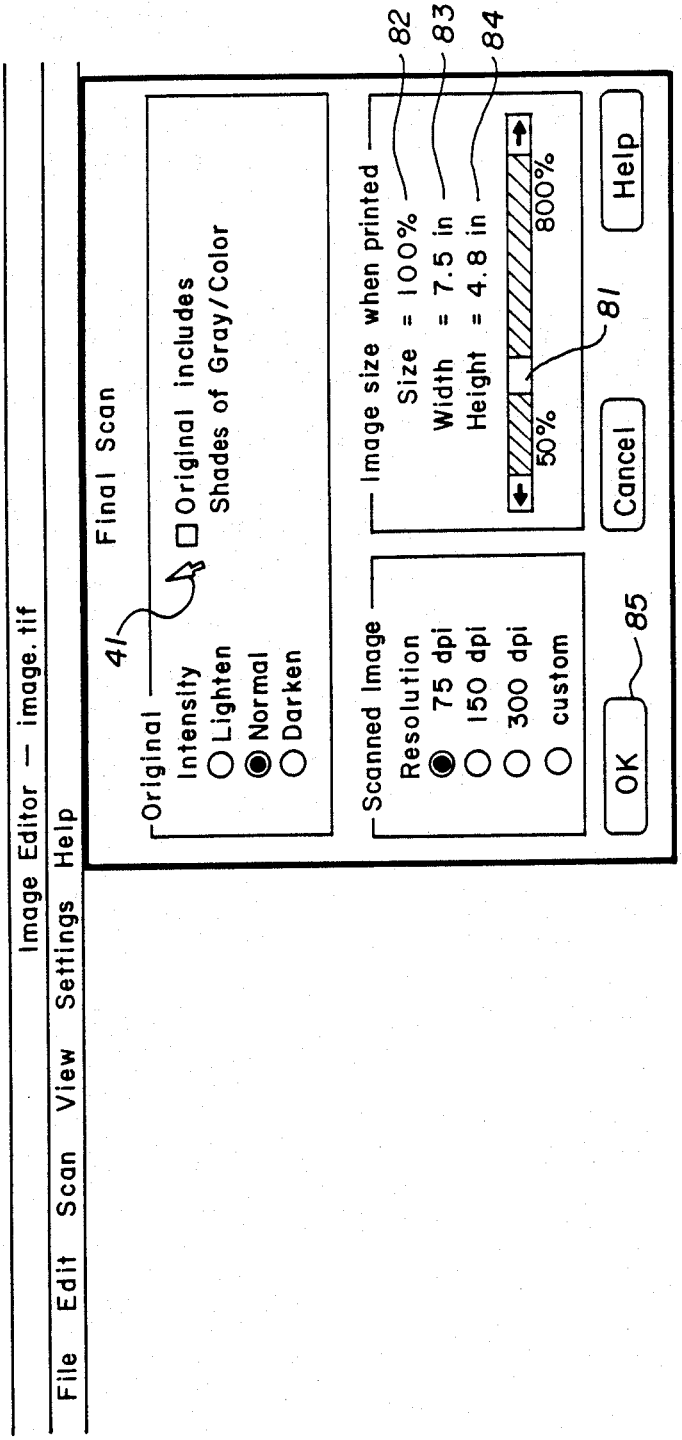

In order to perform a final scan, cursor 41 is placed in a position on window 44 as shown in FIG. 6. Button 27 is depressed on mouse 20, and as mouse 20 is used to move cursor 41 across the screen of monitor 14, a selection box 71 appears as shown in FIG. 7. Selection box 71 is a rectangle. The upper left corner is at the spot where button 27 was depressed. The lower right corner follows cursor 41, as long as user continues to depress button 27. Once the user releases button 27, the position of the lower right corner becomes fixed. The size of selection box 71 may be adjusted by placing cursor, over one of handles 72, depressing button 27, moving cursor 41 to a new location and releasing button 27. The location of selection box 71 may be adjusted by placing cursor 41 inside selection box 71, depressing button 27, and moving mouse 20 until selection box 71 is positioned appropriately. Selection box 71 may be made to disappear by placing cursor 41 outside and depressing and releasing button 27.

In order to perform a final scan, a user brings up a pull down menu 43, by stationing cursor 41 over "Scan" in menu bar 42. See FIG. 4. Then user depresses button 27 on mouse 20. The user must station cursor 41 over "Final Scan" in pull down menu 43, and then release button 27.

As shown in FIG. 7, by placing cursor 41 over various selections and pointing the user can determine intensity, resolution, and indicate whether the original includes shades of gray or shades of color. A scroll bar 81 may be used to select the image size when printed as a printed copy. Scroll bar 81 is moved by placing cursor 41 over scroll bar 81 and depressing button 27. So long as button 27 remains pressed scroll bar 81 will follow cursor 41, as cursor 41 is moved to the right or to the left. When button 27 is released, the bar will remain at the location at which it was when button 27 was released.

The image when printed as a printed copy can be reduced or increased in size. The amount that it can be reduced or increased depends on the resolution selected. For example, at 75 dots per inch resolution, the image may be reduced up to 50% and increased up to 800% when printed as a printed copy. Moving scroll bar 81 to the left reduces the printed copy size. Moving scroll bar 81 to the right enlarges the printed copy size. As scroll bar is moved to the left and right, the printed copy size is displayed in location 82 as a percentage of the original image size. In location 83 the resulting width of the printed copy is given. In location 84 the resulting height of the printed copy is given.

The present invention allows a user to know what will be the dimensions of the the printed copy. This information is very useful in utilizing the image, and can save experimentation usually required to determine the actual size of a printed copy.

The width in location 83 and the height in location 84 may be determined as follows. The width and height of the scanned image should be determined. These are the respective values of the width in location 83 and the height in location 84, when the size in location 82 is 100%. Thereafter, the width in location 83 and the height in location 84 should be varied proportionately to the value in location 82.

Figure 9:
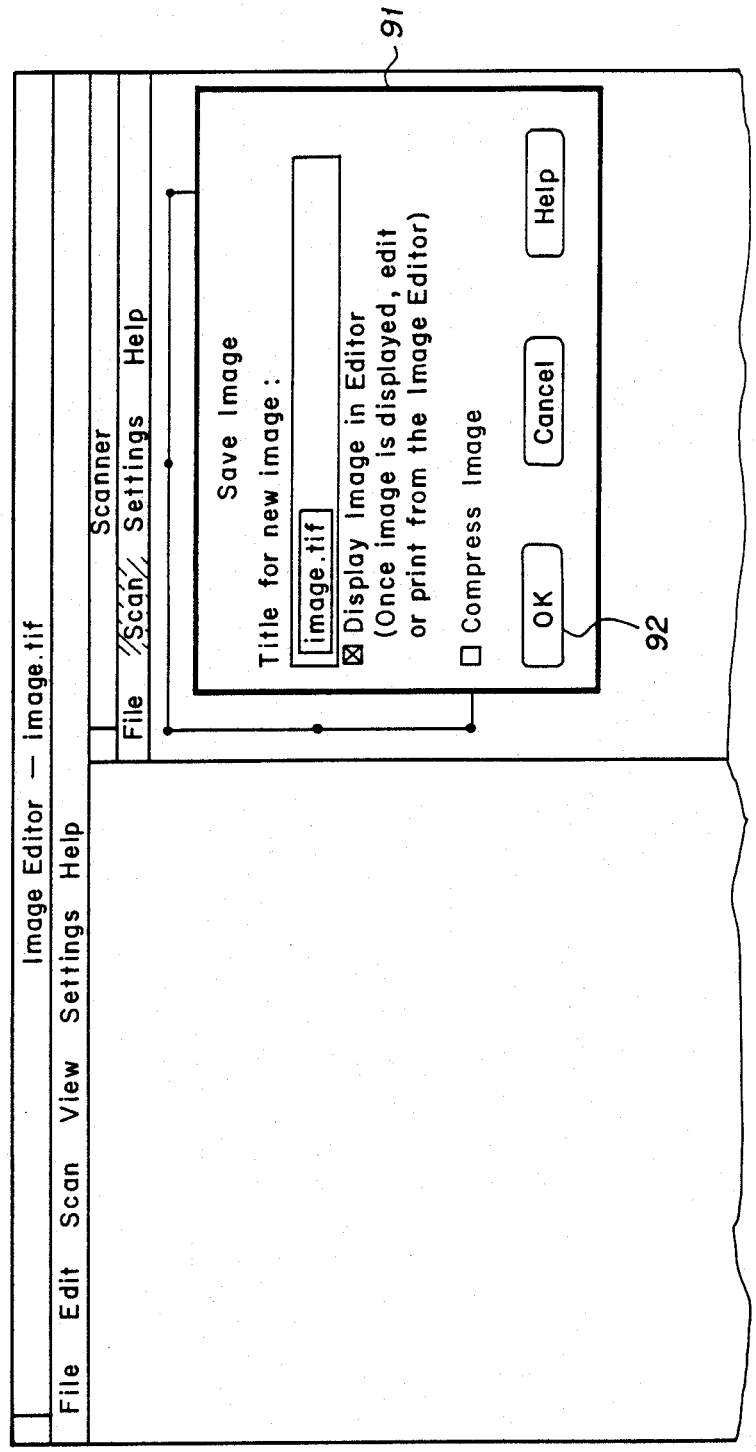

Once the desired settings are chosen, cursor 41 is placed over a region 85, and button 27 is depressed and released. A dialog box 91 will appear, as shown in FIG. 9. A user may rename the image by typing in a new name on keyboard 19, shown in FIG. 1. Additionally, the user can choose to display the image in the editor, and he can choose whether to compress the image.

Figure 10:
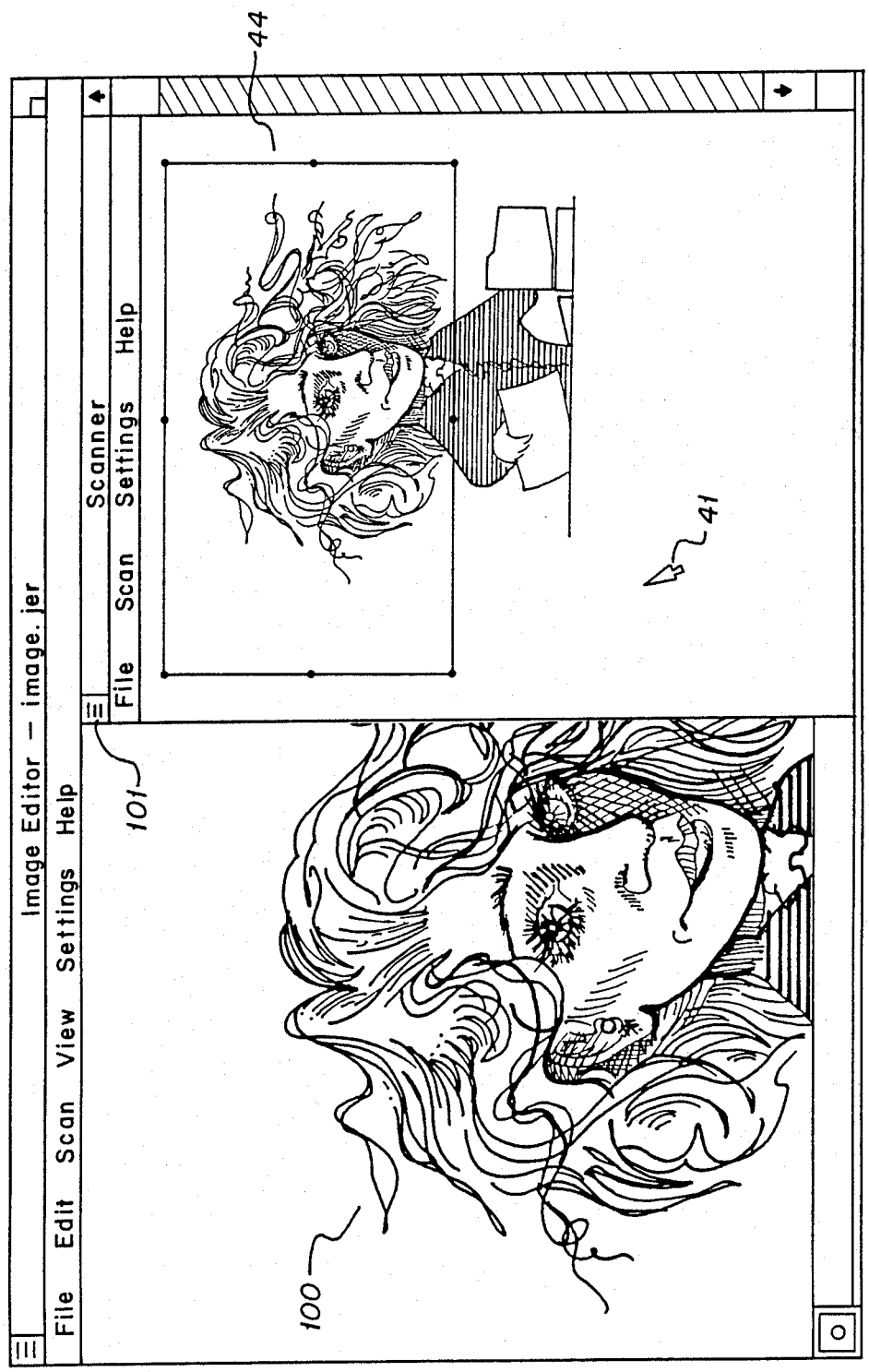
Figure 11:
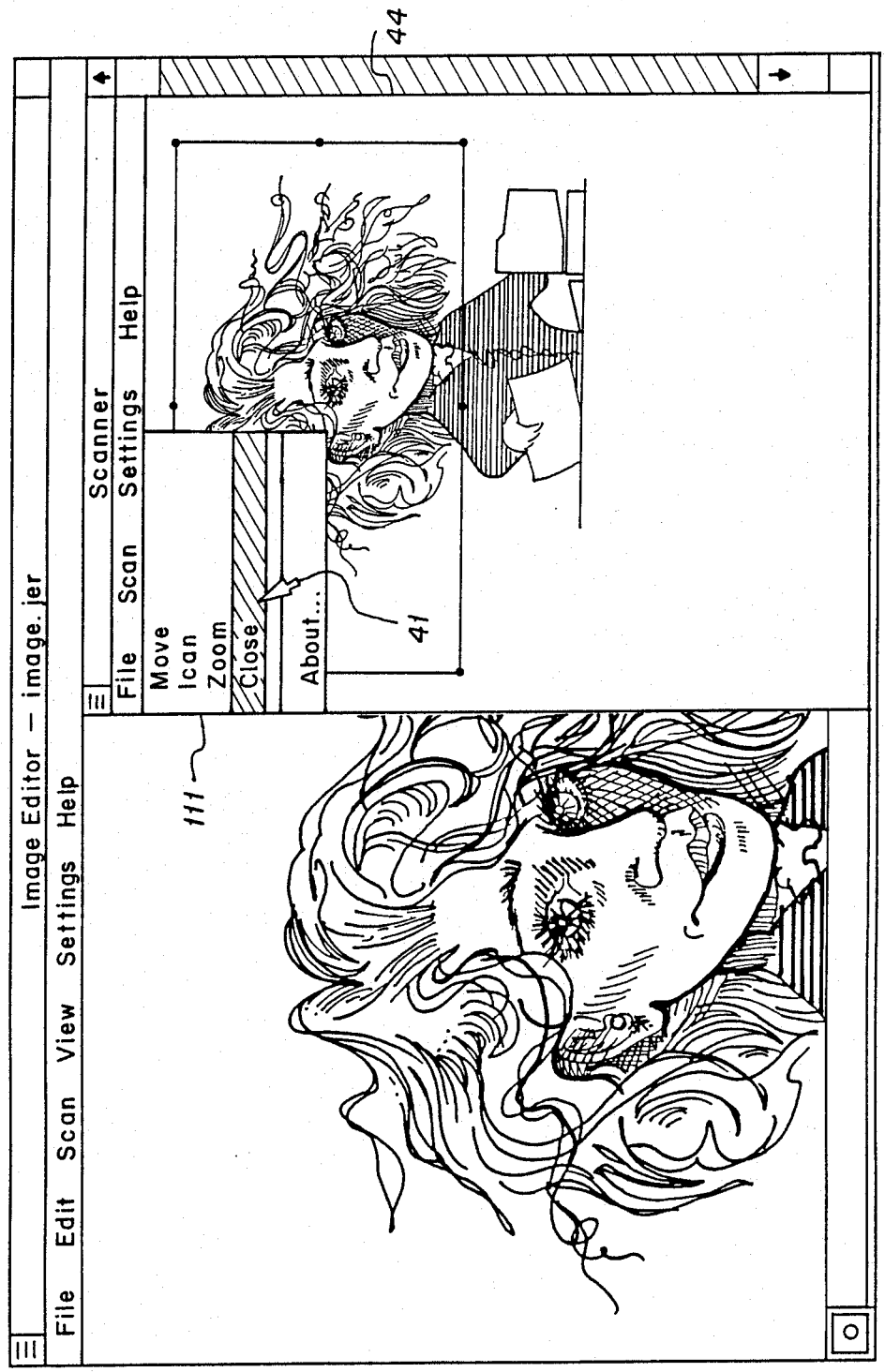
Figure 12:
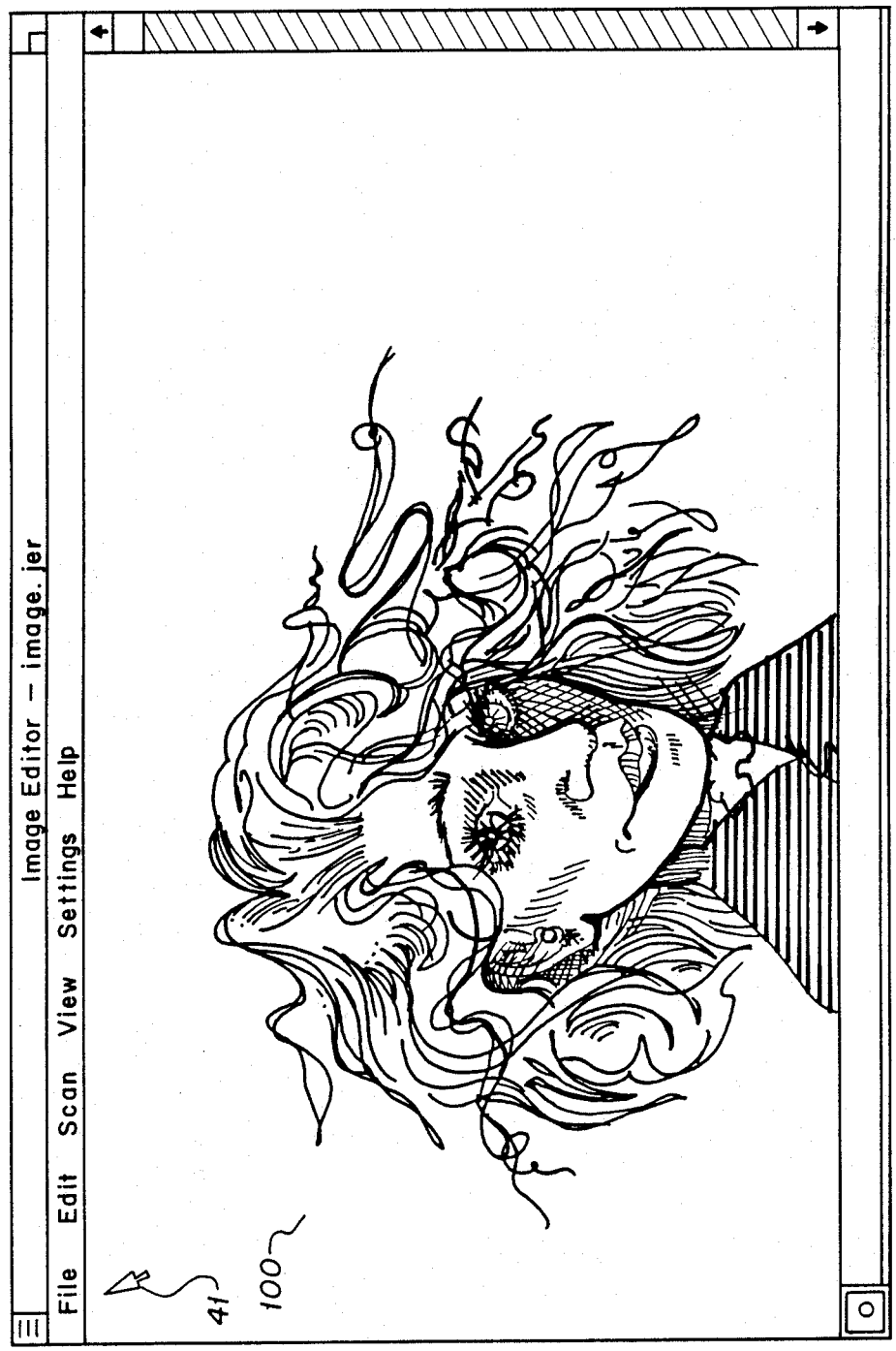

The final scan is performed by placing cursor 41 over region 92, depressing and releasing button 27. Final image 100 appears, as shown in FIG. 10. In order to remove scan window 44, cursor 41 may be placed on top of system menu box 101 and button 27 depressed. Pull down menu 111 will appear, as shown in in FIG. 11. Cursor 41 is dragged to "Close" and button 27 is released. Scan window 44 will disappear leaving final image 100 as shown in FIG. 12.

I claim:

1. In a computing system, a method for scanning a picture using a scanner and for presenting to a user a final scan image of the picture on a screen, the method comprising:

(a) performing a preview scan of the picture to produce a preview scan image of the picture;
(b) displaying the preview scan image of the picture on the screen;
(c) selecting portion of the preview scan image for final scan;
(d) performing a final scan of a portion of the picture which corresponds to the portion of the preview scan image to produce a final scan image; and
(e) displaying on the screen the final scan image produced by the final scan.

2. A method as in claim 1, wherein the following steps are added after step (c):
(c1) displaying the original dimensions of a portion of the picture which corresponds to the portion of the preview scan image;
(c2) allowing the user to specify an amount the portion of the picture will be reduced or enlarged in producing a printed copy of the portion of the picture; and
(c3) varying the displayed original dimensions in accordance with the specified amount of reduction or enlargement in order to reflect the dimensions of the printed copy to be produced.

3. In a scanner system, a method which allows a user to determine the dimensions of a printed copy of a picture to be produced, the method comprising:
displaying the original dimensions of the picture;
allowing the user to specify an amount the picture will be enlarged or reduced in producing the printed copy of the picture; and
varying the displayed original dimensions in accordance with the specified amount of enlargement or reduction in order to reflect the dimensions of the printed image to be produced.

4. In a scanning system including a scanner for scanning a picture and means for displaying a scanned image of a portion of the picture on a screen and for reducing or enlarging the portion of the picture when producing a printed copy of the portion of the picture the improvement comprising:
calculating means for calculating the dimensions of the printed copy to be produced based on the original dimensions of the portion of the picture and the amount the portion of the picture will be reduced or enlarged in producing the printed copy; and
first display means, driven by the calculating means, for displaying the dimensions of the printed copy to be produced.

5. A scanning system as in claim 4 additionally comprising:
second display means for displaying the ratio of the dimensions of the printed copy to be produced to the original dimensions of the portion of the picture.

6. A scanning system including a scanner for scanning a picture and display means for displaying a scanned image on a screen, the improvement comprising:
preview scan means for causing the scanner to perform a preview scan of the picture to produce a preview scan image and for causing the display means to display the preview scan image on the screen;
selection means coupled to the display means for allowing a user to select a portion of the preview scan image for final scan; and
final scan means for causing the scanner to perform a final scan of a portion of the picture which corresponds to the portion of the preview scan image to produce a final scan image and for causing the display means to display the final scan image on the screen.

7. A scanning system as in claim 6, additionally comprising:
means for allowing the user to specify an amount the portion of the picture will be enlarged or reduced in producing a printed copy of the portion of the picture; and
dimension display means for displaying the dimensions of the printed copy to be produced.

8. A scanning system as in claim 6, additionally comprising:
ratio display means for displaying the ratio of the dimensions of the printed copy to be produced to the dimensions of the portion of the picture.

* * * * *